(12) United States Patent
Ogawa et al.

(10) Patent No.: US 10,138,838 B2
(45) Date of Patent: Nov. 27, 2018

(54) ENGINE TORQUE ESTIMATION SYSTEM, AND ENGINE TORQUE ESTIMATION METHOD

(71) Applicant: FUJITSU LIMITED, Kawasaki-shi, Kanagawa (JP)

(72) Inventors: Masatoshi Ogawa, Zama (JP); Hiromitsu Soneda, Atsugi (JP); Noriyasu Aso, Isehara (JP); Takeo Kasajima, Machida (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 222 days.

(21) Appl. No.: 15/295,312

(22) Filed: Oct. 17, 2016

(65) Prior Publication Data

US 2017/0115172 A1 Apr. 27, 2017

(30) Foreign Application Priority Data

Oct. 27, 2015 (JP) ................................. 2015-210834

(51) Int. Cl.
*F02D 41/28* (2006.01)
*F02D 41/00* (2006.01)
(Continued)

(52) U.S. Cl.
CPC ........... *F02D 41/28* (2013.01); *F02D 41/009* (2013.01); *F02D 41/0097* (2013.01);
(Continued)

(58) Field of Classification Search
CPC ............... G01L 3/04; F02D 2200/1004; F02D 41/1497; F02D 2041/1433; F02D 2200/1006; G01M 15/06
(Continued)

(56) References Cited

U.S. PATENT DOCUMENTS 7,194,899 B1 * 3/2007 Chen .................... F02D 41/0097
73/114.25
7,276,877 B2 * 10/2007 Qiu ....................... G05B 13/048
318/453
(Continued)

FOREIGN PATENT DOCUMENTS

| JP | 2006-112373 | 4/2006 |
| JP | 2009-275618 | 11/2009 |
| JP | 2012-188930 | 10/2012 |

OTHER PUBLICATIONS

Itoh et al., "UKF-based Estimation of Indicated Torque for IC engines Utilizing Nonlinear Two-inertia Model", Proc. Of 51$^{st}$ IEEE Conference on Decision and Control, Dec. 10-13, 2012, Maui, HI, pp. 4077 to 4082.

*Primary Examiner* — Elias Desta
(74) *Attorney, Agent, or Firm* — Staas & Halsey LLP (57) ABSTRACT

An engine torque estimation device includes: a memory; a processor coupled to the memory and the processor configured to, acquire a measured value of a crank angle that is a rotation angle of a crank shaft of an engine, derive, based on the measured value of the crank angle, a calculated value of a crank angle speed, and derive an estimated value of an engine torque, based on a non-linear Kalman filter using a first estimation error that is a difference between the calculated value of the crank angle speed and the estimated value of the crank angle speed.

13 Claims, 10 Drawing Sheets

(51) Int. Cl.
  *F02D 41/14* (2006.01)
  *G01L 5/13* (2006.01)
(52) U.S. Cl.
  CPC ............ *F02D 41/1497* (2013.01); *G01L 5/13* (2013.01); *F02D 2041/285* (2013.01); *F02D 2200/101* (2013.01); *F02D 2200/1004* (2013.01)
(58) Field of Classification Search
  USPC .......................................................... 702/41
  See application file for complete search history.

(56) References Cited

U.S. PATENT DOCUMENTS

| | | | |
|---|---|---|---|
| 7,958,779 B2* | 6/2011 | Nagano | F02D 41/0097 |
| | | | 73/114.15 |
| 2004/0167705 A1* | 8/2004 | Lingman | B60T 8/172 |
| | | | 701/124 |
| 2009/0282903 A1 | 11/2009 | Nagano et al. | |
| 2016/0332633 A1* | 11/2016 | Raffone | G01C 9/08 |

\* cited by examiner

ENGINE TORQUE ESTIMATION SYSTEM, AND ENGINE TORQUE ESTIMATION METHOD

CROSS-REFERENCE TO RELATED APPLICATION

This application is based upon and claims the benefit of priority of the prior Japanese Patent Application No. 2015-210834, filed on Oct. 27, 2015, the entire contents of which are incorporated herein by reference.

FIELD

The embodiments discussed herein are related to an engine torque estimation device, an engine torque estimation system, and an engine torque estimation method.

BACKGROUND

It is known to design a state estimator employing a non-linear Kalman filter that estimates an indicated torque of an engine from an observed value of a crank angle obtained from a crank sensor, using a mathematical model.

Japanese Laid-open Patent Publication No. 2009-275618, Japanese Laid-open Patent Publication No. 2006-112373, Japanese Laid-open Patent Publication No. 2012-188930, and Yuzuru Itoh, Kouji Higashi, and Masami Iwase: "UKF-based Estimation of Indicated Torque for IC engines Utilizing Nonlinear Two-inertia Model," Proc. of 51st IEEE Conference on Decision and Control, December (CDC), pp. 4077-4082, (2012) discuss related art.

SUMMARY

According to an aspect of the invention, an engine torque estimation device includes: a memory; a processor coupled to the memory and the processor configured to, acquire a measured value of a crank angle that is a rotation angle of a crank shaft of an engine, derive, based on the measured value of the crank angle, a calculated value of a crank angle speed, and derive an estimated value of an engine torque, based on a non-linear Kalman filter using a first estimation error that is a difference between the calculated value of the crank angle speed and the estimated value of the crank angle speed.

According to another aspect of the invention, an engine torque estimation method for causing a processor to execute a process, the process includes: obtaining a measured value of a crank angle that is a rotation angle of a crank shaft of an engine; deriving a calculated value of a crank angle speed, based on the measured value of the crank angle; and deriving an estimated value of an engine torque, based on a non-linear Kalman filter using a difference between the calculated value of the crank angle speed and an estimated value of the crank angle speed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in the related art, an observed value of a crank angle is normally derived from a pulse waveform of a crank sensor, and therefore, it is difficult to achieve a measurement resolution of a pulse width or more, and the influence thereof is notable on an estimated value of an indicated torque. Therefore, in related art, the phase of an estimated value of an indicated torque is delayed relative to a measured value, and it is difficult to increase the accuracy of the estimated value of the indicated torque.

Therefore, according to one aspect of the invention, it is an object of the present disclosure to increase the accuracy of engine torque estimation.

Each embodiment will be described in detail below with reference to the accompanying drawings.

First Embodiment

Figure 1:
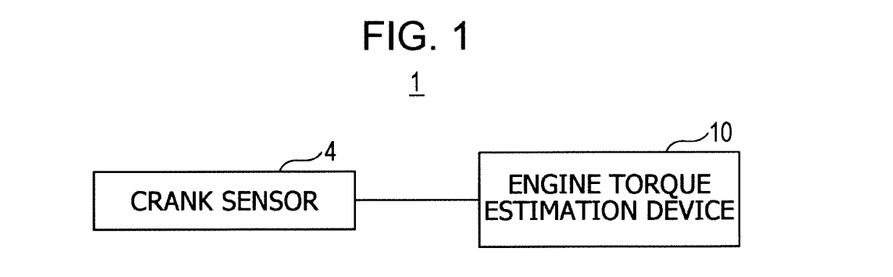
FIG. 1 is a configuration diagram illustrating an example of an engine torque estimation system.

FIG. 1 is a configuration diagram illustrating an example of an engine torque estimation system.

An engine torque estimation system 1 may be mounted on a vehicle including an engine (not illustrated). The vehicle may be a vehicle using only an engine as a driving source or may be a hybrid vehicle using both of an electric motor and an engine as driving sources. The type of the engine is arbitrary and the engine may be, for example, a gasoline engine and may be a diesel engine.

The engine torque estimation system 1 includes a crank sensor 4 and an engine torque estimation device 10.

The crank sensor 4 is attached to the engine. The crank sensor 4 outputs a crank angle signal in accordance with a crank angle that is the rotation angle of a crank shaft (not illustrated) of the engine. For example, the crank sensor 4 generates a crank angle signal in accordance with the rotation angle of a crank shaft (a signal rotor). The crank angle signal may be a signal that generates a pulse at each predetermined crank angle interval (for example, at every 10 CA). An appropriate method may be used as a detection method of the crank sensor 4, and the detection method may be of the electromagnetic induction type or the hall sensor type. Also, the circumference of the signal rotor includes a projection (tooth) at an interval corresponding to the predetermined crank angle interval, and also, may include a toothless portion for top dead center detection.

As will be described later, the engine torque estimation device 10 derives an estimated value of an indicated torque, based on the crank angle signal from the crank sensor 4. A method for deriving the estimated value of the indicated torque will be described later. The engine torque estimation device 10 may be mounted, for example, in an engine control device that controls the engine. As another alternative, the engine torque estimation device 10 may be coupled to the engine control device (see FIG. 9) and, in this case, the engine torque estimation device 10 sends the estimated value of the indicated torque obtained according to an embodiment, which will be described later, to the engine control device.

Figure 2:
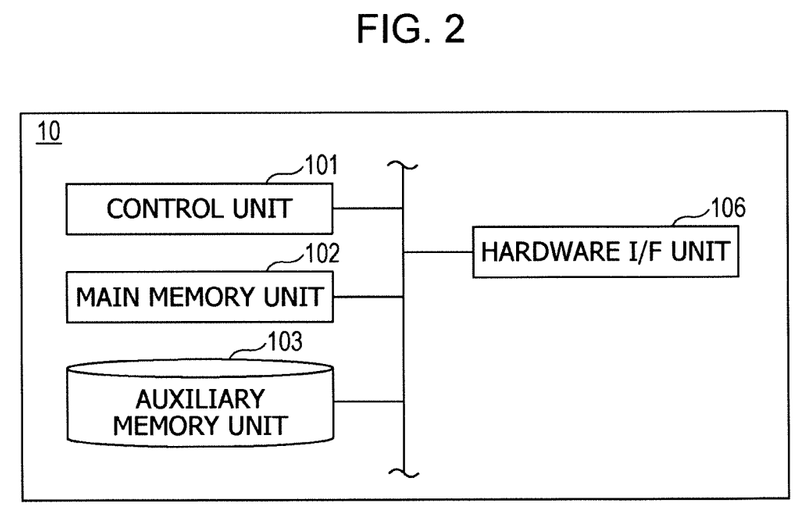
FIG. 2 is a diagram illustrating an example of a hardware configuration of an engine torque estimation device.

FIG. 2 is a diagram illustrating an example of a hardware configuration of the engine torque estimation device 10. The hardware of the engine torque estimation device 10 may include, for example, a processor such as a microcomputer, a field programmable gate array (FPGA), a programmable logic controller (PLC), or the like.

In the example illustrated in FIG. 2, the engine torque estimation device 10 includes a control unit 101, a main memory unit 102, an auxiliary memory unit 103, and a hardware I/F unit 106.

The control unit 101 is an arithmetic unit that executes a program stored in the main memory unit 102 or the auxiliary memory unit 103, receives data from a storage device, performs an operation and processing on the data, and then, outputs the data to the storage device or the like. The control unit 101 may be a processor or may include, for example, a processor such as a central processing unit (CPU), a timer counter, or the like.

The main memory unit 102 is a read only memory (ROM), a random access memory (RAM), or the like, and is a storage device that stores or temporarily holds an OS that is a basic software executed by the control unit 101, a program, such as an application software or the like, and data.

The auxiliary memory unit 103 is an electric-erasable programmable read-only memory (EEPROM) or the like, and is a storage device that stores data related to an application software or the like.

The hardware I/F unit 106 is an interface between a vehicle network (such as, for example, a controller area network (CAN), or the like) and the engine torque estimation device 10a or between a peripheral device (such as, for example, a crank sensor 4 or the like) of the engine and the engine torque estimation device 10. The hardware I/F unit 106 is coupled with the vehicle network or peripheral device via a wired and/or wireless circuit(s) or the like.

Note that, in the example illustrated in FIG. 2, each of various types of processing, which will be described below, may be performed by causing the control unit 101 to execute a program.

Figure 3:
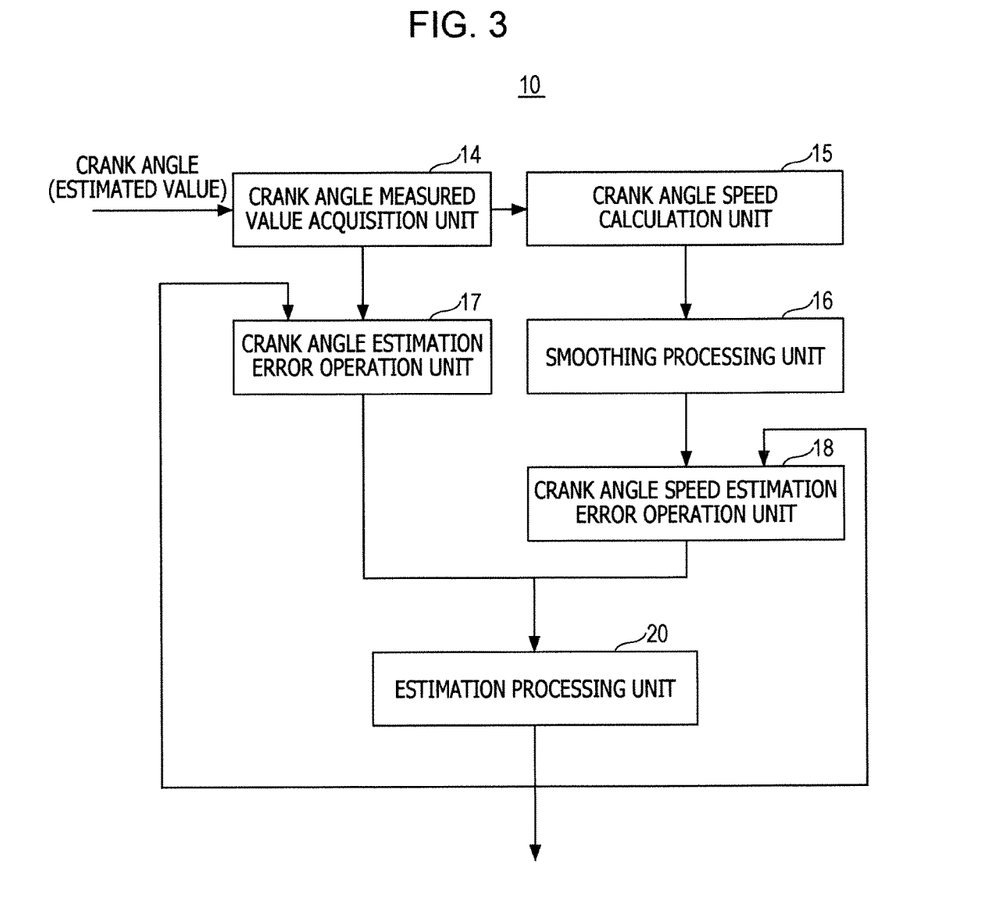
FIG. 3 is a functional block diagram of the engine torque estimation device according to a first embodiment.

FIG. 3 is a functional block diagram of the engine torque estimation device 10 according to a first embodiment.

The engine torque estimation device 10 includes a crank angle measured value acquisition unit 14 (an example of an acquisition unit), a crank angle speed calculation unit 15, a smoothing processing unit 16, a crank angle estimation error operation unit 17, a crank angle speed estimation error operation unit 18, and an estimation processing unit 20 (an example of an estimation unit). Each of the crank angle measured value acquisition unit 14, the crank angle speed calculation unit 15, the smoothing processing unit 16, the crank angle estimation error operation unit 17, the crank angle speed estimation error operation unit 18, and estimation processing unit 20 are realized by causing the control unit 101 to execute a program in the main memory unit 102.

Figure 4:
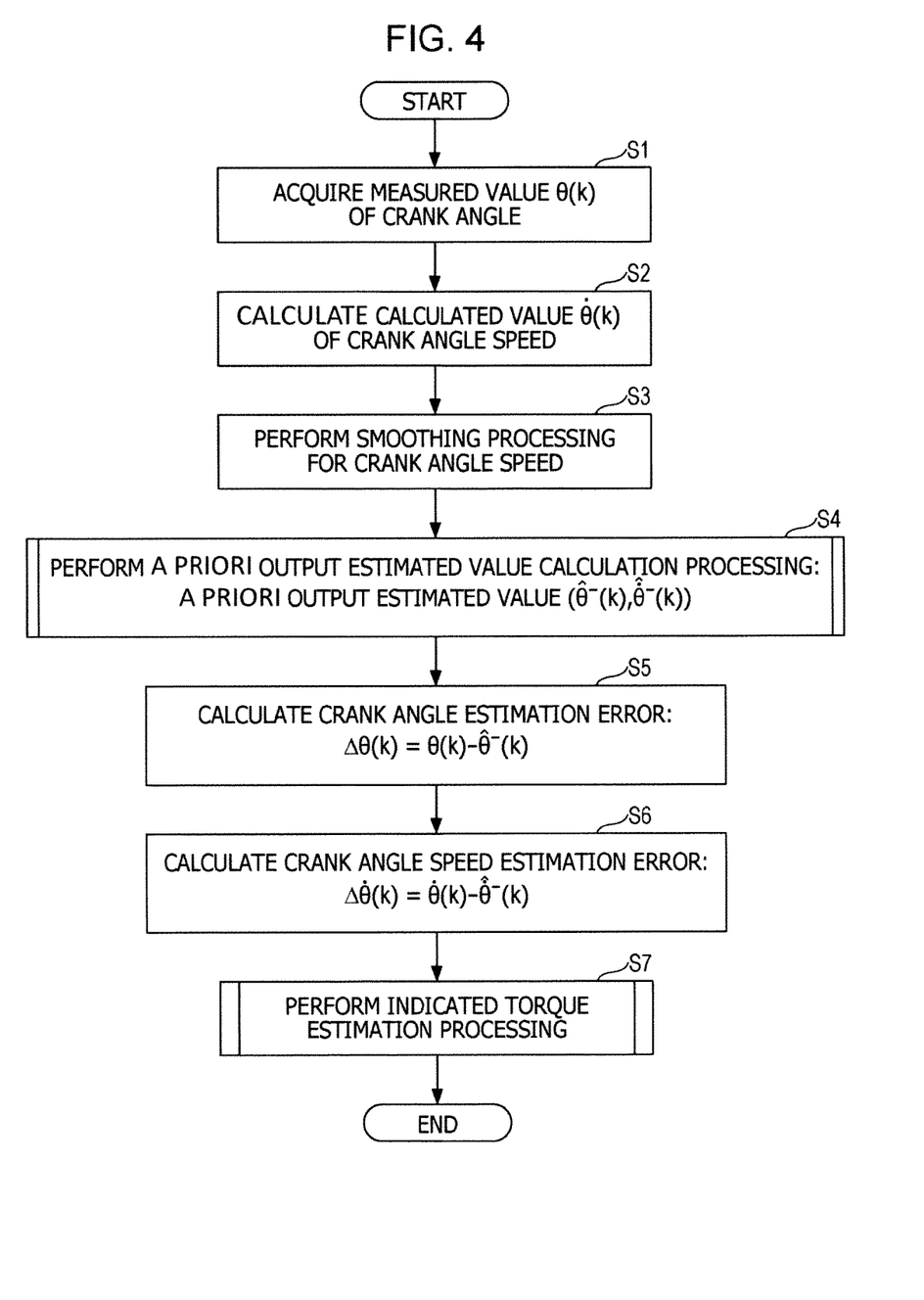
FIG. 4 is a flowchart illustrating an example of processing executed by the engine torque estimation device according to the first embodiment.

FIG. 4 is a flowchart illustrating an example of processing executed by the engine torque estimation device 10. The processing illustrated in FIG. 4 is repeatedly executed, for example, in each update cycle (for example, every 20 msec). The update cycle may be synchronized with a sampling cycle of a measured value of a crank angle. In this case, for example, as for the update cycle k, update is repeated from 1 to 2, 3, . . . , or N.

Note that, in the following description, a letter with a mark "^" (which will be hereinafter referred to as a "hat" if necessary) above the letter such as $\hat{\theta}$ indicates an estimated value. Also, a letter with a mark "−" on the upper right side of the letter such as $\theta^-$ indicates a priori value. A letter with a mark "•" (which will be hereinafter referred to as a "dot" if necessary) above the letter such as $\dot{\theta}$ indicates a differential value.

In Step S1, the crank angle measured value acquisition unit 14 acquires the measured value of the crank angle, based on a crank angle signal sent from the crank sensor 4.

In Step S2, the crank angle speed calculation unit 15 calculates a crank angle speed, based on the measured value of the crank angle sent from the crank sensor 4. For example, the crank angle speed may be calculated by dividing a difference between a priori value and a current value of the measured value of the crank angle by the sampling cycle.

In Step S3, the smoothing processing unit 16 performs smoothing processing on data (time series) of a calculated value of the crank angle speed acquired from the crank angle speed calculation unit 15 before and after each sample point. In smoothing processing, a moving average method or the like may be used. For example, the smoothing processing unit 16 performs smoothing in accordance with the moving average method within a window width of 30 points before and after a sample point. By the above-described smoothing processing, the influence of noise or the like may be reduced and the accuracy of estimation of an indicated torque, which will be described later, may be increased. The smoothing processing unit 16 sends a calculated value of the crank angle speed after smoothing processing to the crank angle speed estimation error operation unit 18.

In Step S4, the estimation processing unit 20 performs a priori output estimated value calculation processing in which a priori output estimated value is calculated. The a priori output estimated value includes an estimated value of the crank angle, which is expressed by Expression 1 below, and an estimated value of the crank angle speed, which is expressed by Expression 2 below.

$$\hat{\theta}^-(k) \qquad (1)$$

$$\hat{\dot{\theta}}^-(k) \qquad (2)$$

In the following, an example of a priori output estimated value calculation processing will be described later. The estimation processing unit 20 sends the calculated estimated value of the crank angle and the calculated estimated value of the crank angle speed to the crank angle estimation error operation unit 17 and the crank angle speed estimation error operation unit 18, respectively.

In Step S5, the crank angle estimation error operation unit 17 calculates an estimation error $\Delta\theta(k)$ of the crank angle, which is a difference between the measured value $\theta(k)$ of the crank angle received from the crank sensor 4 and the estimated value of the crank angle received from the estimation processing unit 20. Specifically, the crank angle estimation error operation unit 17 calculates as follows.

$$\Delta\theta(k)=\theta(k)-\hat{\theta}^-(k) \quad (3)$$

When initial processing is performed, a predetermined initial value may be used as the estimated value of the crank angle. The crank angle estimation error operation unit 17 sends the calculated estimation error of the crank angle to the estimation processing unit 20. Note that the estimation error of the crank angle is an example of a second estimation error.

In Step S6, the crank angle speed estimation error operation unit 18 calculates the estimation error $\Delta\dot{\theta}(k)$ of the crank angle speed, which is a difference between the calculated value $\dot{\theta}(k)$ of the crank angle speed received from the smoothing processing unit 16 and the estimated value of the crank angle speed received from the estimation processing unit 20. Specifically, the crank angle speed estimation error operation unit 18 calculates as follows.

$$\Delta\dot{\theta}(k)=\dot{\theta}(k)-\hat{\dot{\theta}}^-(k) \quad (4)$$

When initial processing is performed, a predetermined initial value may be used as the estimated value of the crank angle speed. The crank angle speed estimation error operation unit 18 sends the calculated estimation error of the crank angle speed to the estimation processing unit 20. Note that the estimation error of the crank angle speed is an example of a first estimation error.

In Step S7, the estimation processing unit 20 estimates an indicated torque, based on the non-linear Kalman filter using the estimation error $\Delta\theta(k)$ of the crank angle acquired in Step S5 and the estimation error $\Delta\dot{\theta}(k)$ of the crank angle speed acquired in Step S6. A specific example of the above-described estimation processing will be described in detail below.

Note that, in the processing illustrated in FIG. 4, the order of Step S5 and Step S6 may be reversed.

Next, a specific example of a priori output estimated value calculation processing (Step S4 in FIG. 4) and estimation processing (Step S7 of FIG. 4) performed by the estimation processing unit 20 will be described. A case where an unscented Kalman filter (UKF) is used as the non-linear Kalman filter will be described herein, but a non-linear Kalman filter of another type, that is, for example, an extended Kalman filter may be used.

First, an example of a mathematical model used in the estimation processing unit 20 will be described. The mathematical model is a model in which, as described below, an output variable y(k) is calculated using a non-linear function f and a non-linear function h when a state variable (a state estimated value) x(k) is given.

$$x(k) = \begin{bmatrix} \theta(k) \\ \dot{\theta}(k) \\ \tau(k) \end{bmatrix} \quad (5)$$

$$x(k+1) = f(x(k), v(k)) \quad (6)$$

$$\begin{bmatrix} \theta(k) \\ \dot{\theta}(k) \end{bmatrix} = h(x(k), \omega(k)) \quad (7)$$

$$y(k) = \begin{bmatrix} \theta(k) \\ \dot{\theta}(k) \end{bmatrix} \quad (8)$$

In Expression 5, $\theta(k)$ is the crank angle, $\dot{\theta}(k)$ is the crank angle speed, and $\tau(k)$ is the indicated torque. The reference character "k" is the update cycle (the number of updates). In Expression 6, v(k) is system noise and, in Expression 7, $\omega(k)$ is observed noise.

Figure 5:
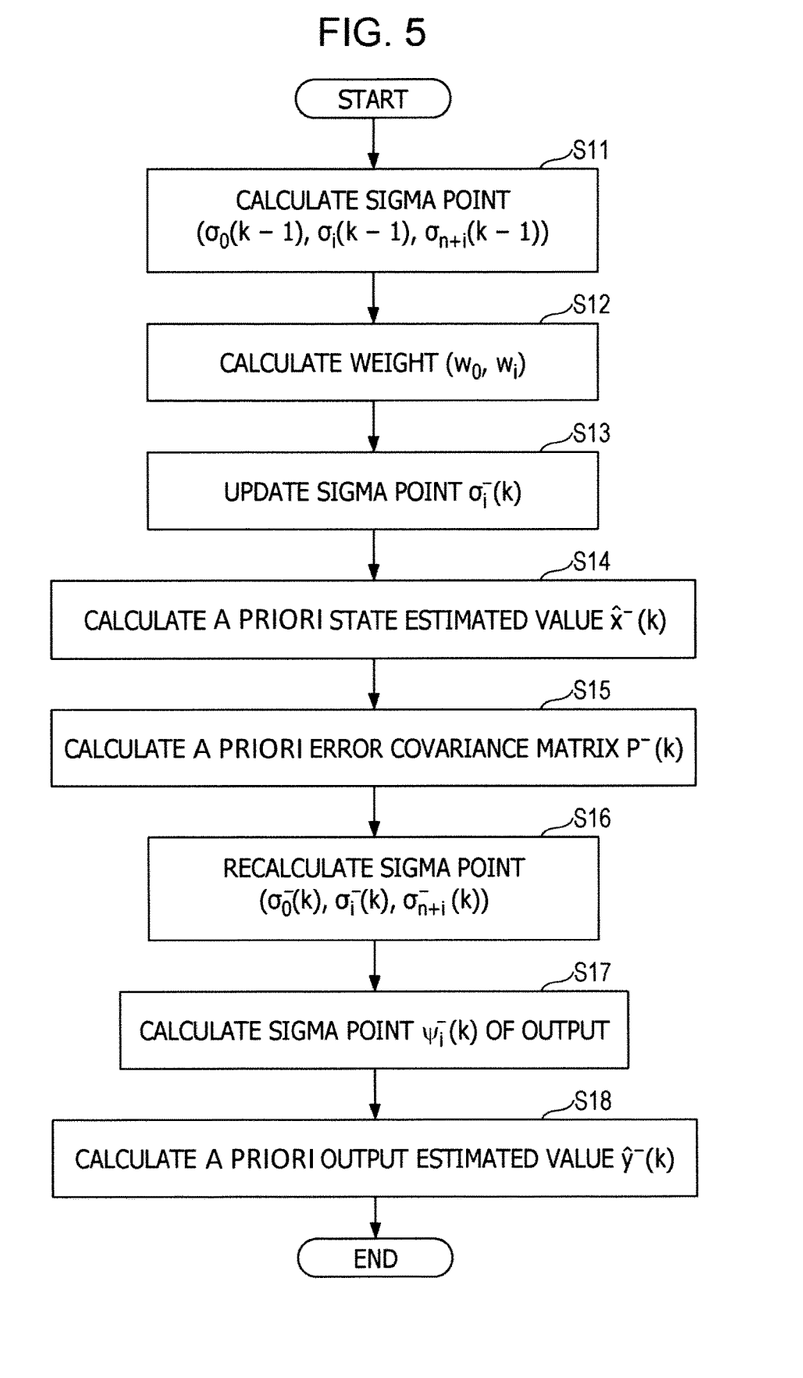
FIG. 5 is a flowchart illustrating an example of a priori output estimated value calculation processing performed by an estimation processing unit.

FIG. 5 is a flowchart illustrating an example of a priori output estimated value calculation processing performed by the estimation processing unit 20. Note that a priori output estimated value calculation processing is executed as processing in a previous stage of estimation processing illustrated in FIG. 6, which will be described later.

In Step S11, the estimation processing unit 20 calculates 2n+1 sigma points as sample points corresponding to an average value and a standard deviation, based on a state estimated value $\hat{x}(k-1)$ one-cycle before (k−1) and a post error covariance matrix P(k−1) one-cycle before (k−1). Specifically, the estimation processing unit 20 calculates as follows. A subscript i indicates an ith element.

$$\sigma_0(k-1)=\hat{x}(k-1) \quad (9)$$

$$\sigma_i(k-1)=\hat{x}(k-1)+\sqrt{n+\kappa}(\sqrt{P(k-1)})_i, (i=1, 2, \ldots, n) \quad (10)$$

$$\sigma_{n+i}(k-1)=\hat{x}(k-1)-\sqrt{n+\kappa}(\sqrt{P(k-1)})_i, (i=1, 2, \ldots, n) \quad (11)$$

In this case, $(\sqrt{P})$, in Expressions 10 and 11 indicates an ith column of the square root matrix of a post error covariance matrix P.

Note that the matrix P is a positive-definite symmetric matrix and the ith column of the square root matrix may be calculated by Cholesky decomposition or singular value decomposition. Note that, as the initial value $\hat{x}(0)$ of the state estimated value, an arbitrary fixed value may be used, and the state estimated value at a previous engine off time may be used.

$$\hat{x}(0) = \begin{bmatrix} \theta(0) \\ \dot{\theta}(0) \\ \tau(0) \end{bmatrix} \quad (12)$$

Also, as the initial value P(0), described as the expression 13, of the post error covariance matrix, an arbitrary fixed value may be used, and the post error covariance matrix at a previous engine off time may be used.

$$P(0)=P_0 \quad (13)$$

In Step S12, the estimation processing unit 20 calculates the weight for each sigma point. Specifically, the estimation processing unit 20 calculates as follows. Note that $\kappa$ is a scale parameter.

$$w_0 = \frac{\kappa}{n+\kappa} \quad (14)$$

$$w_i = \frac{\kappa}{2(n+\kappa)}, (i=1, 2, \cdots 2n) \quad (15)$$

In Step S13, based on the sigma points acquired in Step S11, the estimation processing unit 20 updates the sigma points using the non-linear function f of the mathematical model. Specifically, the estimation processing unit 20 updates as follows.

$$\sigma_i^-(k)=f(\sigma_i(k-1)), (i=1, 2, \ldots, 2n) \quad (16)$$

In Step S14, based on the weight acquired in Step S12 and the sigma points updated in Step S13, the estimation processing unit 20 calculates the a priori state estimated value $\hat{x}^-(k)$.

Specifically, the estimation processing unit 20 calculates as follows.

$$\hat{x}(k) = \Sigma_{i=0}^{2n} w_i \sigma_i^-(k), (i=1, 2, \ldots, 2n) \quad (17)$$

In Step S15, based on the sigma points updated in Step S13 and the a priori state estimated value acquired in Step S14, the estimation processing unit 20 calculates the a priori error covariance matrix P⁻(k) in a current cycle.

Specifically, the estimation processing unit 20 calculates as follows.

$$P^-(k) = \Sigma_{i=0}^{2n} \omega_i (\sigma_i^-(k) - \hat{x}^-(k))(\sigma_i^-(k) - \hat{x}^-(k))^T + Qbb^T,$$
$$(i=1, 2, \ldots, 2n) \quad (18)$$

In Expression 18, Q is the variance of system noise and b is a coefficient matrix of the system noise.

In Step S16, based on the a priori state estimated value acquired in Step S14 and the a priori error covariance matrix acquired in Step S15, the estimation processing unit 20 recalculates 2n+1 sigma points. Specifically, the estimation processing unit 20 calculates as follows.

$$\sigma_0^-(k) = \hat{x}^-(k) \quad (19)$$

$$\sigma_i^-(k) = \hat{x}^-(k) + \sqrt{n+k}(\sqrt{P^-(k)})_i, (i=1, 2, \ldots, n) \quad (20)$$

$$\sigma_{n+i}^-(k) = \hat{x}^-(k) - \sqrt{n+\kappa}(\sqrt{P^-(k)})_i, (i=1, 2, \ldots, n) \quad (21)$$

In Step S17, based on the sigma points acquired in Step S16 and the non-linear function h of the mathematical model, the estimation processing unit 20 calculates $\Psi_i^-(k)$ as a sigma point of an output.

Specifically, the estimation processing unit 20 calculates as follows.

$$\Psi_i^-(k) = h(\sigma_i^-(k)), (i=1, 2, \ldots, 2n) \quad (22)$$

In Step S18, based on the weight acquired in Step S12 and the sigma point of the output acquired in Step S17, the estimation processing unit 20 calculates the a priori output estimated value (k).

Specifically, the estimation processing unit 20 calculates as follows.

$$\hat{y}^-(k) = \begin{bmatrix} \hat{\theta}^-(k) \\ \hat{\dot{\theta}}^-(k) \end{bmatrix} = \sum_{i=0}^{2n} w_i \Psi_i^-(k) \quad (23)$$

Figure 6:
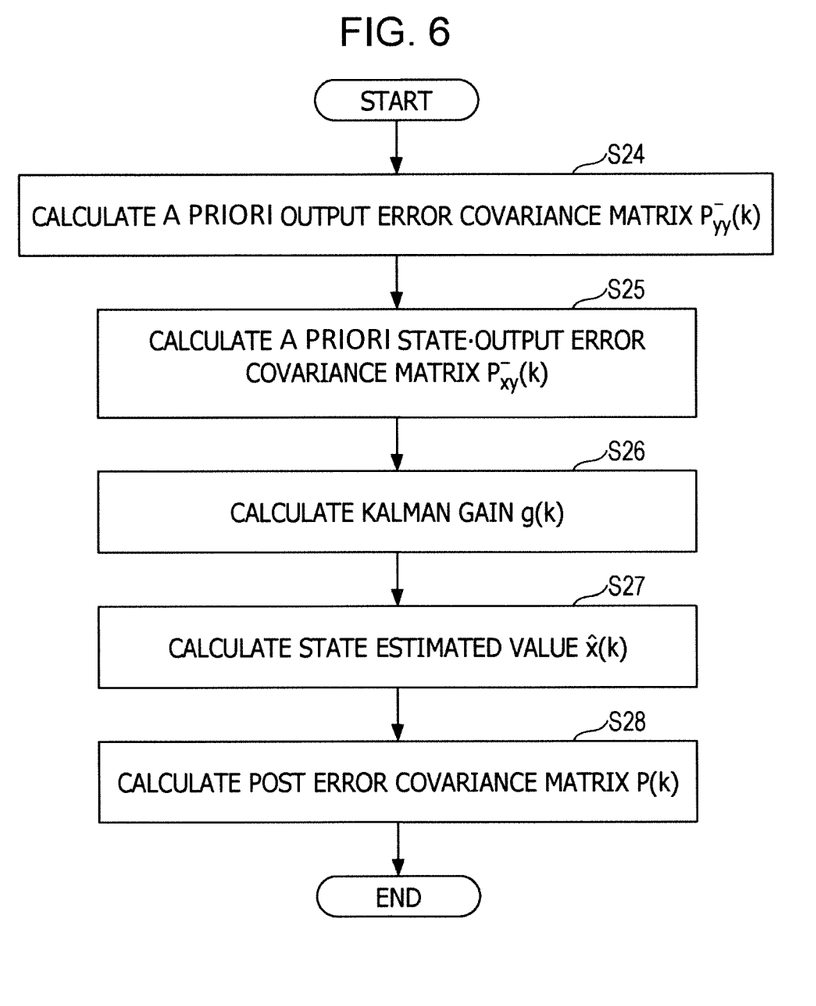
FIG. 6 is a flowchart illustrating an example of estimation processing performed by the estimation processing unit.

FIG. 6 is a flowchart illustrating an example of estimation processing performed by the estimation processing unit 20. The processing illustrated in FIG. 6 is executed subsequently to the a priori output estimated value calculation processing illustrated in FIG. 5.

In Step S24, based on the weight acquired in Step S12, the sigma point of the output acquired in Step S17, and the a priori output estimated value acquired in Step S18, the estimation processing unit 20 calculates the a priori output error covariance matrix $P_{yy}^-(k)$.

Specifically, the estimation processing unit 20 calculates as follows.

$$P_{yy}^1(k) = \Sigma_{i=0}^{2n} \omega_i (\Psi_i^-(k) - \hat{y}^-(k))^2 \quad (24)$$

In Step S25, the estimation processing unit 20 calculates a priori state output error covariance matrix $P_{xy}^-(k)$. In this case, in the calculation of $P_{xy}^-(k)$, the estimation processing unit 20 uses the weight obtained in Step S12, the a priori state estimated value obtained in Step S14, the sigma points obtained in Step S16, the sigma point of the output obtained in Step S17, and the a priori output estimated value obtained in Step S18. Specifically, the estimation processing unit 20 calculates as follows.

$$P_{xy}^-(k) = \Sigma_{i=0}^{2n} w_i (\sigma_i^-(k) - \hat{x}^-(k))(\Psi_i^-(k) - \hat{y}^-(k)) \quad (25)$$

In Step S26, based on the a priori output error covariance matrix obtained in Step S24, the a priori state and output error covariance matrix obtained in Step S25, and the variance R of observed noise, the estimation processing unit 20 calculates a Kalman gain g(k). Specifically, the estimation processing unit 20 calculates as follows.

$$g(k) = \frac{P_{xy}^-(k)}{P_{yy}^-(k) + R} \quad (26)$$

In Step S27, the estimation processing unit 20 calculates the state estimated value in the current cycle, which is expressed by Expression 27.

$$\hat{x}(k) = \begin{bmatrix} \theta(k) \\ \dot{\theta}(k) \\ \tau(k) \end{bmatrix} \quad (27)$$

In this case, the estimation processing unit 20 uses the a priori state estimated value obtained in Step S14, the Kalman gain acquired in Step S26, the estimation error $\Delta\theta(k)$ of the crank angle (see Step S5 in FIG. 4), and the estimation error $\Delta\dot{\theta}(k)$ of the crank angle speed (see Step S6 in FIG. 4). Specifically, the estimation processing unit 20 calculates as follows.

$$\hat{x}(k) = \hat{x}^-(k) + g(k) \begin{bmatrix} \Delta\theta(k) \\ \Delta\dot{\theta}(k) \end{bmatrix} \quad (28)$$

Thus, the estimated value τ(k) of the indicated torque may be acquired.

In Step S28, the estimation processing unit 20 calculates the post error covariance matrix P(k) (see Step S11) for use in next update. In this case, the estimation processing unit 20 uses the a priori error covariance matrix acquired in Step S15, the a priori state and output error covariance matrix obtained in Step S25, and the Kalman gain obtained in Step S26. Specifically, the estimation processing unit 20 calculates as follows.

$$P(k) = P^-(k) - g(k)(P_{xy}^-)(k))^T \quad (29)$$

As has been described, the processing illustrated in FIG. 5 and FIG. 6 is performed, and thereby, the indicated torque is estimated based on the non-linear Kalman filter using both of the estimation error of the crank angle and the estimation error of the crank angle speed.

Next, advantages of this embodiment will be described with reference to FIG. 7 and FIG. 8.

Figure 7:
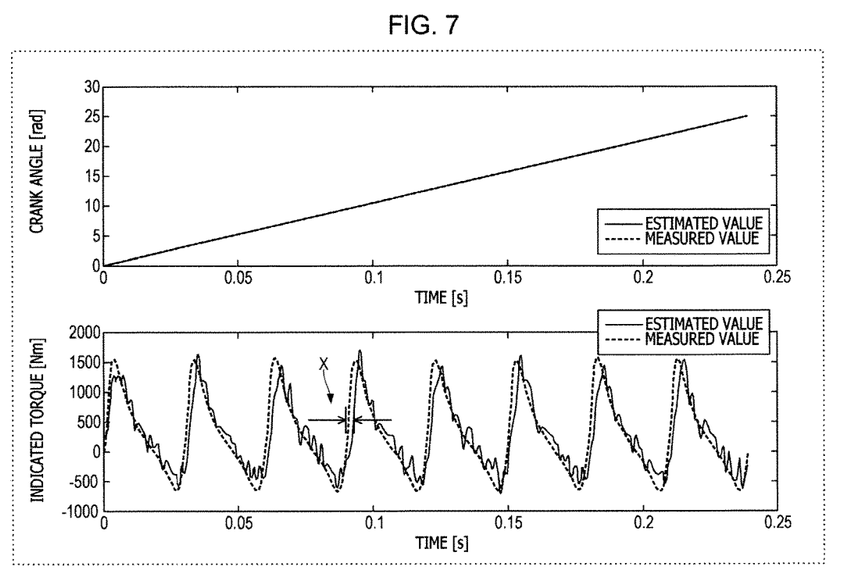
FIG. 7 is a chart illustrating estimation results for an indicated torque according to a comparative example.

FIG. 7 is a chart illustrating estimation results for an indicated torque according to a comparative example. In FIG. 7, the upper graph is for the crank angle in rad and the lower graph is for the indicated torque in Nm. FIG. 8 is a chart illustrating estimation results for an indicated torque according to this embodiment. In FIG. 8, the upper graph is for the crank angle, the middle graph is for the crank angle speed in rad/s, and the lower graph is for the indicated torque. In FIG. 7 and FIG. 8, a measured value is indicated by a dotted line and an estimated value is indicated by a solid line.

As for a comparative example, a method in which the indicated torque is estimated based on a non-linear Kalman filter using only the estimation error of the crank angle is used. That is, as for the comparative example, a method in which, assuming that the indicated torque and the crank angle are used to indicate state quantity, the indicated torque is estimated based on a non-linear Kalman filter using the measured value of the crank angle as an observable is used.

Incidentally, the measured value of the crank angle is extracted from the pulse waveform of the crank sensor 4, and therefore, it is difficult to achieve a measurement resolution of a pulse width or more, and the influence thereof affects the accuracy of the estimated value of the indicated torque. Therefore, according to the comparative example, as schematically indicated by an arrow X in FIG. 7, the phase of the estimated value of the indicated torque is delayed relative to the measured value and, due to the phase delay, the accuracy of the estimated value (an instantaneous value) of the indicated torque is reduced. As for actual estimation results for the comparative example under a predetermined engine operating condition, the average of phase shifts is 1.338 msec and the root mean square error (RMSE) is 292.10.

Figure 8:
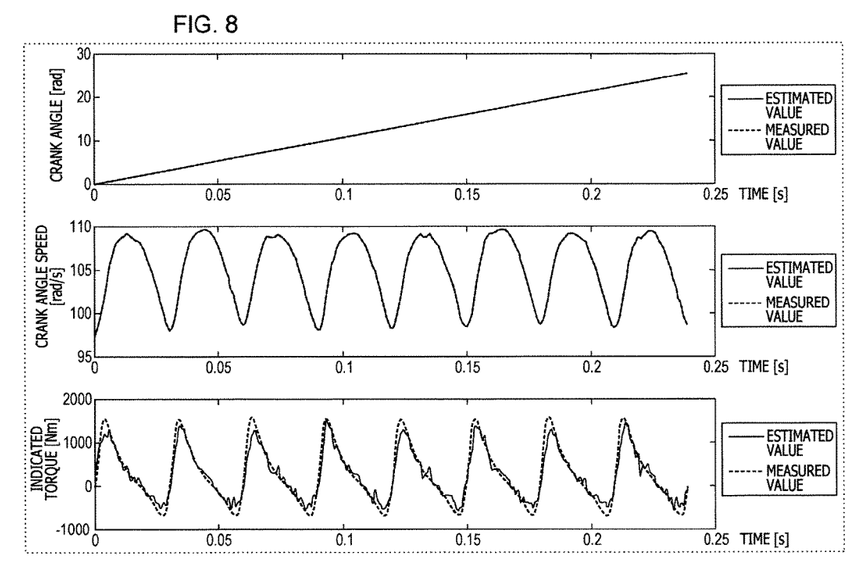
FIG. 8 is a chart illustrating estimation results for an indicated torque according to the first embodiment.

In contrast, according to this embodiment, as illustrated in FIG. 8, the phase delay of the estimated value of the indicated torque relative to the measured value may be reduced, as compared to the comparative example. This is because, in this embodiment, the estimation error of the crank angle speed is used in the non-linear Kalman filter. The crank angle speed is preferable as a parameter used for estimation of the indicated torque because, as compared to the crank angle, a dimension of the physical quantity of the crank angle speed is close to a corresponding dimension of a torque. Therefore, according to this embodiment, as compared to the comparative example, the phase delay of the estimated value of the indicated torque relative to the measured value may be reduced, and the accuracy of the estimated value of the indicated torque may be increased. As for actual estimation results for this embodiment under the same predetermined engine operating condition as that of the comparative example, the average of phase shifts is 0.263 msec, the root mean square error is 173.54, and the root mean square error is reduced by about 41%.

Incidentally, in engine torque base control, in general, required net torque is determined based on an operation of an accelerator performed by a driver, or the like, and the indicated torque that satisfies the net torque is estimated. In this case, in an actual vehicle, as an option, the current indicated torque may be measured using a cylinder pressure sensor, but it is difficult at present to install a cylinder pressure sensor therein because problems regarding cost, durability, and maintainability are caused by the installing the cylinder pressure sensor. Therefore, when it is possible to estimate the indicated torque at high accuracy using sensor data of the crank sensor 4 mounted on an actual vehicle without newly installing a sensor, this estimation method may be effectively used for increasing the performance of an engine control system.

In this point, according to this embodiment, as has been described above, the indicated torque may be estimated at high accuracy using sensor data of the crank sensor 4, and therefore, the engine torque estimation device 10 may be effectively used for increasing the performance of an engine control system.

Figure 9:
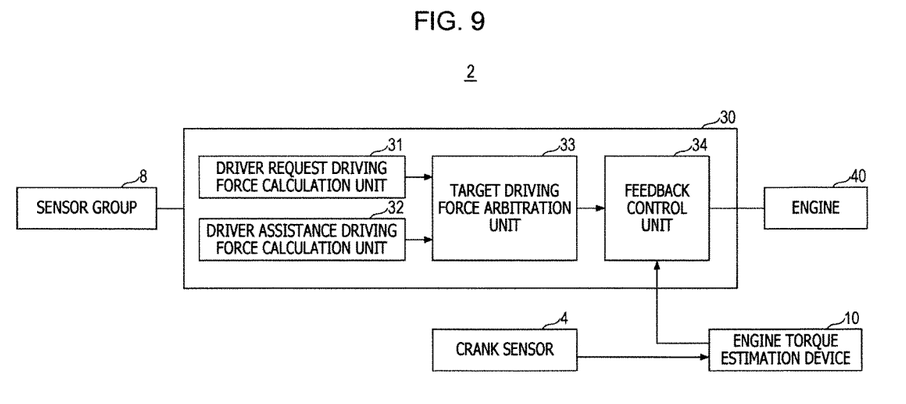
FIG. 9 is a diagram illustrating an example of an engine control system including the engine torque estimation device.

FIG. 9 is a diagram illustrating an example of an engine control system including the engine torque estimation device 10.

An engine control system 2 is mounted on a vehicle. As described above, the vehicle may be a vehicle using only an engine as a driving source and may be also a hybrid vehicle. The engine control system 2 includes a sensor group 8, an engine control device 30, an engine 40, the crank sensor 4, and the engine torque estimation device 10.

The sensor group 8 includes, as various types of sensors other than the crank sensor 4, for example, an accelerator sensor, a vehicle speed sensor, a radar sensor, an image sensor, or the like.

The engine control device 30 electrically controls the engine 40. Note that electrical control of the engine 40 may be realized, for example, by electrically controlling the opening (that is, throttle opening) of a throttle valve disposed in an intake manifold of the engine 40, although not illustrated. As another option, electrical control of the engine 40 may be realized, for example, by electrically controlling the amount of a fuel injected into a combustion chamber of the engine 40 and ignition timing, or electrically controlling the phase of an intake camshaft that adjusts valve opening and closing timing.

The engine control device 30 may include the hardware configuration illustrated in FIG. 2. The engine control device 30 includes, as illustrated in FIG. 9, a driver request driving force calculation unit 31, a driver assistance driving force calculation unit 32, a target driving force arbitration unit 33, and a feedback control unit 34.

Based on information received from the vehicle speed sensor and the accelerator sensor, the driver request driving force calculation unit 31 calculates driver request driving force (which will be hereinafter referred to as "first request driving force") in accordance with the vehicle speed and an accelerator opening.

Based on information received from the radar sensor or the like, the driver assistance driving force calculation unit 32 calculates request driving force (which will be hereinafter referred to as "second request driving force") used for assisting driving of a vehicle by a driver. The second request driving force may be, for example, driving force used for driving the vehicle at a predetermined vehicle speed, driving force used for following a preceding vehicle, a driving force used for limiting the vehicle speed such that the vehicle speed does not exceed a vehicle speed limit, or the like.

The target driving force arbitration unit 33 selects one of the first request driving force and the second request driving force in accordance with a predetermined rule. For example, during execution of adaptive cruise control (ACC), the target driving force arbitration unit 33 selects the second request driving force while the first request driving force is 0 and selects the first request driving force when the first request driving force is larger than a predetermined value. The target driving force arbitration unit 33 converts the selected request driving force to a torque expression in N·m and sends the converted request driving force as a request driving torque to the feedback control unit 34.

The feedback control unit 34 may determine, for example, based on a difference between the request driving torque given by the target driving force arbitration unit 33 and the estimated value of the indicated torque given by the engine torque estimation device 10, a control target value for the engine 40 such that a request driving torque is realized. The control target value for the engine may be, for example, a target value of the throttle opening, a target value of the amount of injection of a fuel, or the like. Note that, equivalently, instead of the estimated value of the indicated torque, the estimated value of net torque, which is estimated based on the estimated value of the indicated torque, may be used. For example, the net torque may be calculated by deducting a friction torque of the engine from the estimated value of the indicated torque. Also, the friction torque of the engine may be calculated, for example, based on a rotation speed of an engine and an engine load. Also, the feedback control unit 34 may determine, as a control target value of the engine, a target value at an ignition time, based on the estimated value of the indicated torque given by the engine torque estimation device 10. The feedback control unit 34 controls the engine 40 such that the determined control target value is realized.

The engine control system 2 illustrated in FIG. 9 includes the engine torque estimation device 10 and may feedback-control the engine 40, based on a difference between the request driving force and the estimated value of the indicated torque. As has been described above, the accuracy of estimation of the estimated value of the indicated torque sent from the engine torque estimation device 10 is high, and therefore, the driving torque of the engine 40 may be highly accurately controlled. Thus, for example, excessive injection of a fuel into a cylinder is not performed, and the engine performance is increased and fuel efficiency and drivability are increased. As has been described above, the engine torque estimation device 10 may be effectively used for increasing the performance of the engine control system.

Second Embodiment

An engine torque estimation device 10A according to a second embodiment may include the same hardware configuration as that of the engine torque estimation device 10 according to the first embodiment, which has been described above, but has a different function.

Figure 10:
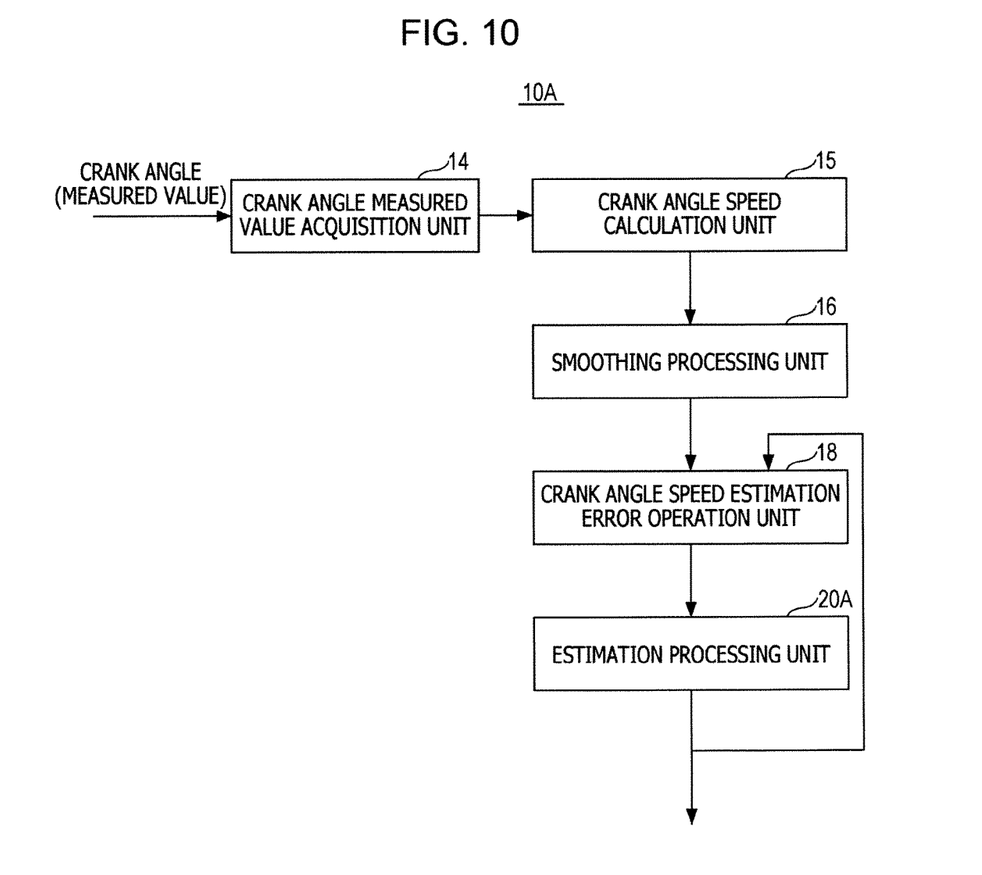
FIG. 10 is a functional block diagram of an engine torque estimation device according to a second embodiment.

FIG. 10 is a functional block diagram of the engine torque estimation device 10A.

The engine torque estimation device 10A is different from the engine torque estimation device 10 according to the first embodiment, which has been described above, in that the crank angle estimation error operation unit 17 is omitted and the estimation processing unit 20 is replaced with an estimation processing unit 20A. Other than that, the engine torque estimation device 10A may include the same configuration as that of the engine torque estimation device 10. In FIG. 10, each part of the engine torque estimation device 10A, which is similar to or the same as that of the corresponding part of the engine torque estimation device 10, is denoted by the same reference as that of the corresponding part, and the description thereof is omitted.

The estimation processing unit 20A is different from the estimation processing unit 20 according to the first embodiment, which has been described above, in that the indicated torque is estimated based on a non-linear Kalman filter using the estimation error of the crank angle speed. That is, the estimation processing unit 20A estimates the indicated torque, based on a non-linear Kalman filter using the estimation error of the crank angle speed, not using the estimation error of the crank angle.

Figure 11:
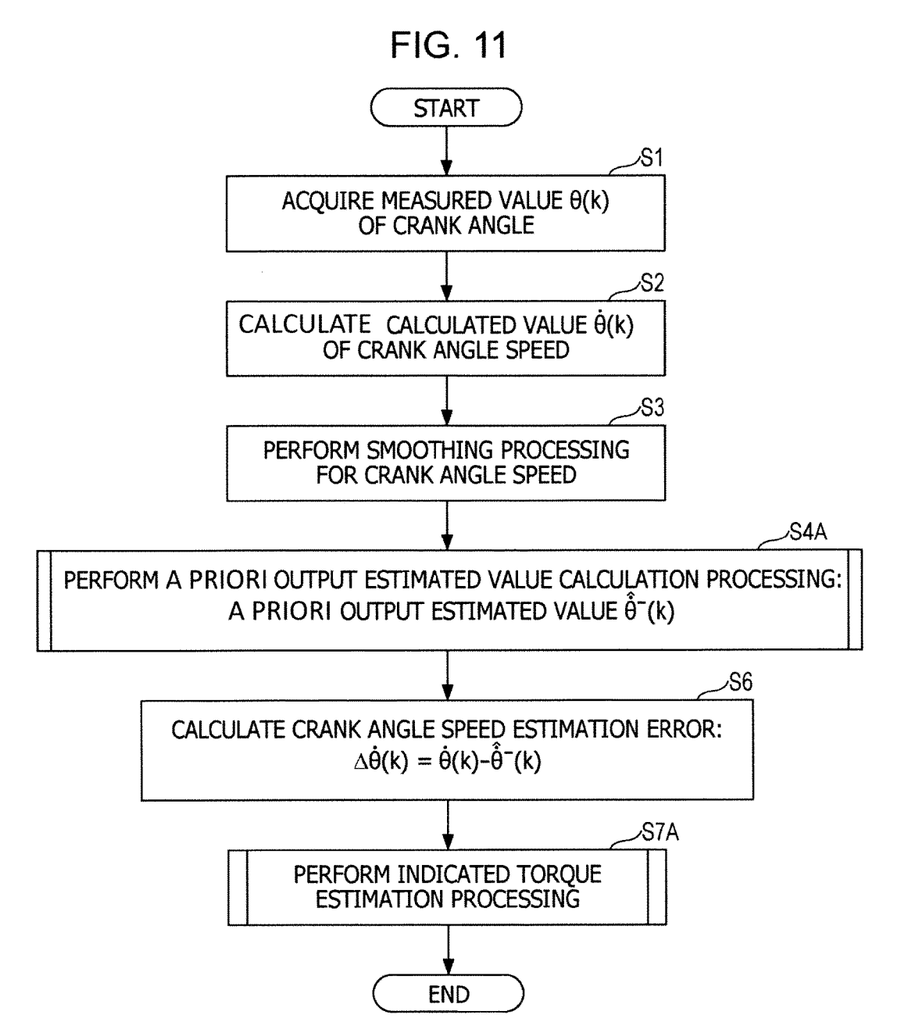
FIG. 11 is a flowchart illustrating an example of processing executed by the engine torque estimation device according to the second embodiment.

FIG. 11 is a flowchart illustrating an example of processing executed by the engine torque estimation device 10A. The processing of FIG. 11 is repeatedly executed, for example, in each update cycle (for example, every 20 msec).

The processing of FIG. 11 is different from the processing illustrated in FIG. 4 according to the first embodiment, which has been described above, in that Step S5 is omitted, Step S4 and Step S7 are replaced with Step S4A and Step S7A, respectively. A difference of the processing of FIG. 11 from the processing illustrated in FIG. 4 according to the first embodiment, will be described below.

In Step S4A, the estimation processing unit 20A performs a priori output estimated value calculation processing in which a priori output estimated value is calculated. In the second embodiment, the a priori output estimated value does not include the estimated value of the crank angle but only includes the estimated value of the crank angle speed.

In Step S7A, the estimation processing unit 20A estimates the indicated torque, based on the non-linear Kalman filter using the estimation error $\Delta\theta(k)$ of the crank angle speed acquired in Step S6. In a specific example of this estimation processing, a mathematical model according to this embodiment is different from the mathematical model according to the first embodiment, which has been described above, in that the crank angle $\theta(k)$ is not included in the output variable y(k). Also, the non-linear Kalman filter according to this embodiment is different from that according to the first embodiment in that the estimation error of the crank angle is not used. Other than that, substantially the same processing may be performed and the description thereof may be omitted.

According to the second embodiment, similar advantages to those of the first embodiment may be also achieved. In estimation results according to the second embodiment, under the same predetermined engine operating condition as that of the comparative example, which has been described above, RMSE is 200.8 and the average of phase shifts is 0.543 msec. Therefore, even in the case where only the estimation error of the crank angle speed is used, higher accuracy than that of the above-described comparative example (RMSE: 292.10, the average of phase shifts: 1.338 msec) may be achieved.

Although each of the first and second embodiments has been described in detailed above, the present disclosure is not limited to specific embodiments and various modifications and changes may be made to those embodiments without departing from the scope of the present disclosure as set forth in the claims. Also, all or some of components of the above-described embodiments may be combined.

For example, although, in each of the above-described embodiments, the parameter that represents an engine torque included in the state variablex(k) is the indicated torque, instead of the indicated torque, another parameter (for example, a net torque or a torque acquired by deducting an external load torque from the indicated torque) may be used.

Also, although, in each of the above-described embodiments, as an example, a vehicle including an engine is a target of estimation, the target may be arbitrary as long as the target includes an engine. For example, the target may be a railway vehicle including an engine, a ship including an engine, a construction machine including an engine, a motorcycle (a type of vehicles) including an engine, an aircraft including an engine, a helicopter including an engine, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An engine torque estimation system comprising:
   an engine torque estimation device including a memory and a processor coupled to the memory and configured to derive an estimated value of an engine torque; and
   an engine control device coupled to the engine torque estimation device and an engine,
   wherein the engine torque estimation device is configured to:
   acquire a measured value of a crank angle that is a rotation angle of a crank shaft of the engine,
   derive, based on the measured value of the crank angle, a calculated value of a crank angle speed,
   derive the estimated value of the engine torque, based on a non-linear Kalman filter using a first estimation error that is a difference between the calculated value of the crank angle speed and an estimated value of the crank angle speed, and
   output the estimated value of the engine torque to the engine control device,
   wherein the engine control device is configured to control the engine based on a difference between the estimated value of the engine torque and a requested driving torque.

2. The engine torque estimation system according to claim 1,
   wherein the estimated value of the crank angle speed is an a priori estimated value based on the non-linear Kalman filter, and
   the processor is configured to
   calculate the first estimation error and a Kalman gain, based on the non-linear Kalman filter, to derive the estimated value of the engine torque.

3. The engine torque estimation system according to claim 1,
   wherein the processor is configured to derive the estimated value of the engine torque, based on the non-linear Kalman filter using a second estimation error that is a difference between the measured value of the crank angle and the estimated value of the crank angle.

4. The engine torque estimation system according to claim 3,
   wherein the estimated value of the crank angle is an a priori estimated value based on the non-linear Kalman filter, and
   the processor is configured to calculate, based on the non-linear Kalman filter, the first estimation error, the second estimation error, and the Kalman gain to derive the estimated value of the engine torque in each cycle.

5. The engine torque estimation system according to claim 1,
   wherein the processor is configured to,
   process the calculated value of the crank angle speed using a moving average method and derive the first estimation error using the calculated value after being processed.

6. The engine torque estimation system according to claim 1, wherein an initial value is used as the estimated value of the crank angle speed at an initial processing.

7. The engine torque estimation system according to claim 1,
   wherein the non-linear Kalman filter is based on a mathematical model in which the crank angle and the crank angle speed are calculated using the engine torque.

8. The engine torque estimation system according to claim 1,
   wherein the non-linear Kalman filter is an unscented Kalman filter.

9. An engine torque estimation method comprising:
   obtaining, by a processor, a measured value of a crank angle that is a rotation angle of a crank shaft of an engine;
   deriving a calculated value of a crank angle speed, based on the measured value of the crank angle;
   deriving an estimated value of an engine torque, based on a non-linear Kalman filter using a difference between the calculated value of the crank angle speed and an estimated value of the crank angle speed; and
   controlling the engine based on a difference between the estimated value of the engine torque and a requested driving torque.

10. An engine torque estimation system comprising;
    a crank sensor that outputs a crank angle signal in accordance with a crank angle that is a rotation angle of a crank shaft of an engine;
    an engine control device coupled to an engine; and
    a processor coupled to the engine device and configured to,
    acquire a measured value of a crank angle, based on the crank angle signal sent from the crank sensor;
    derive a calculated value of a crank angle speed, based on the measured value of the crank angle;
    derive an estimated value of an engine torque, based on a non-linear Kalman filter using a difference between the calculated value of the crank angle speed and an estimated value of the crank angle speed; and
    output the estimated value of the engine torque to the engine control device,
    wherein the engine control device is configured to control the engine based on a difference between the estimated value of the engine torque and a requested driving torque.

11. The engine torque estimation system according to claim 1, wherein the engine is mounted on one of a vehicle, a railway vehicle, a ship, a construction machine, a motorcycle, an aircraft and a helicopter.

12. The engine torque estimation method according to claim 9, wherein the engine is mounted on one of a vehicle, a railway vehicle, a ship, a construction machine, a motorcycle, an aircraft and a helicopter.

13. The engine torque estimation system according to 10, wherein the engine is mounted on one of a vehicle, a railway vehicle, a ship, a construction machine, a motorcycle, an aircraft and a helicopter.

* * * * *